US012602944B2

(12) United States Patent
Kozicki

(10) Patent No.: US 12,602,944 B2
(45) Date of Patent: Apr. 14, 2026

(54) AUTHENTICATION OF DENDRITIC STRUCTURES

(71) Applicant: Arizona Board of Regents on behalf of Arizona State University, Scottsdale, AZ (US)

(72) Inventor: Michael N. Kozicki, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 266 days.

(21) Appl. No.: 18/044,758

(22) PCT Filed: Sep. 10, 2021

(86) PCT No.: PCT/US2021/049929
§ 371 (c)(1),
(2) Date: Mar. 9, 2023

(87) PCT Pub. No.: WO2022/056300
PCT Pub. Date: Mar. 17, 2022

(65) Prior Publication Data
US 2023/0394857 A1 Dec. 7, 2023

Related U.S. Application Data

(60) Provisional application No. 63/076,708, filed on Sep. 10, 2020.

(51) Int. Cl.
*G06V 20/00* (2022.01)
*G06T 7/00* (2017.01)

(52) U.S. Cl.
CPC ............ *G06V 20/95* (2022.01); *G06T 7/0002* (2013.01); *G06T 2207/20224* (2013.01)

(58) Field of Classification Search
CPC ...... G06V 20/95; G01N 21/21; G07D 7/2033; G06T 2207/10152; G06T 2207/20081
See application file for complete search history.

(56) References Cited

U.S. PATENT DOCUMENTS 4,038,158 A 7/1977 Bursey et al.
4,158,807 A 6/1979 Senturia
(Continued)

FOREIGN PATENT DOCUMENTS

EP 2237183 A1 10/2010
FR 2890666 A1 3/2007
(Continued)

OTHER PUBLICATIONS

Molecular Reproduction & Development _ Reproductive Biology Journal _ Wiley Online Library (Year: 2013).*
(Continued)

*Primary Examiner* — Vu Le
*Assistant Examiner* — Zaid Muhammad Saleh
(74) *Attorney, Agent, or Firm* — Fish & Richardson P.C.

(57) ABSTRACT

Assessing the authenticity of a dendrite on a substrate includes illuminating the dendrite and the substrate with radiation, obtaining a first image of the dendrite on the substrate at a first polarization angle, obtaining a second image of the dendrite on the substrate at a second polarization angle, and assessing a difference in intensity of a multiplicity of corresponding pixels of the candidate structure in the first image and the second image. If the difference in intensity of each pair of pixels of the multiplicity of corresponding pixels exceeds a preselected value, the dendrite is identified as authentic.

25 Claims, 1 Drawing Sheet

(56) References Cited

U.S. PATENT DOCUMENTS

| | | |
|---|---|---|
| 4,586,988 A | 5/1986 | Nath et al. |
| 4,885,227 A | 12/1989 | Nakamura |
| 5,477,088 A | 12/1995 | Rockett et al. |
| 5,761,115 A | 6/1998 | Kozicki et al. |
| 5,896,312 A | 4/1999 | Kozicki et al. |
| 5,914,893 A | 6/1999 | Kozicki et al. |
| 6,084,796 A | 7/2000 | Kozicki et al. |
| 6,184,456 B1 | 2/2001 | Matsuyama et al. |
| 6,340,544 B1 | 1/2002 | Akutsu et al. |
| 6,388,324 B2 | 5/2002 | Kozicki |
| 6,418,049 B1 | 7/2002 | Kozicki et al. |
| 6,469,364 B1 | 10/2002 | Kozicki |
| 6,487,106 B1 | 11/2002 | Kozicki |
| 6,635,914 B2 | 10/2003 | Kozicki et al. |
| 6,798,692 B2 | 9/2004 | Kozicki et al. |
| 6,825,489 B2 | 11/2004 | Kozicki |
| 6,865,117 B2 | 3/2005 | Kozicki |
| 6,914,802 B2 | 7/2005 | Kozicki |
| 6,927,411 B2 | 8/2005 | Kozicki |
| 6,940,745 B2 | 9/2005 | Kozicki |
| 6,985,378 B2 | 1/2006 | Kozicki |
| 6,998,312 B2 | 2/2006 | Kozicki et al. |
| 7,006,376 B2 | 2/2006 | Kozicki |
| 7,081,641 B2 | 7/2006 | Kawasaki et al. |
| 7,101,728 B2 | 9/2006 | Kozicki et al. |
| 7,142,450 B2 | 11/2006 | Kozicki et al. |
| 7,145,794 B2 | 12/2006 | Kozicki |
| 7,169,635 B2 | 1/2007 | Kozicki |
| 7,180,104 B2 | 2/2007 | Kozicki |
| 7,201,821 B2 | 4/2007 | Hoshino et al. |
| 7,227,169 B2 | 6/2007 | Kozicki |
| 7,288,781 B2 | 10/2007 | Kozicki |
| 7,294,875 B2 | 11/2007 | Kozicki |
| 7,372,065 B2 | 5/2008 | Kozicki et al. |
| 7,380,128 B2 | 5/2008 | Bourrieres et al. |
| 7,385,219 B2 | 6/2008 | Kozicki et al. |
| 7,402,847 B2 | 7/2008 | Kozicki et al. |
| 7,405,967 B2 | 7/2008 | Kozicki et al. |
| 7,438,237 B2 | 10/2008 | Bourrieres et al. |
| 7,560,722 B2 | 7/2009 | Kozicki |
| 7,647,279 B2 | 1/2010 | Bourrieres et al. |
| 7,675,766 B2 | 3/2010 | Kozicki |
| 7,726,708 B2 | 6/2010 | Bourrieres et al. |
| 7,728,322 B2 | 6/2010 | Kozicki |
| 7,763,158 B2 | 7/2010 | Kozicki |
| 7,783,081 B2 | 8/2010 | Roques et al. |
| 7,815,117 B2 | 10/2010 | Tuschel et al. |
| 7,852,451 B2 | 12/2010 | Kim et al. |
| 8,039,870 B2 | 10/2011 | Burke et al. |
| 8,056,822 B2 | 11/2011 | Bourrieres et al. |
| 8,292,986 B2 | 10/2012 | Goia et al. |
| 8,345,910 B2 | 1/2013 | Chae et al. |
| 8,396,265 B1 | 3/2013 | Ross et al. |
| 8,576,070 B2 | 11/2013 | Bourrieres et al. |
| 8,742,531 B2 | 6/2014 | Kozicki |
| 8,999,819 B2 | 4/2015 | Kozicki et al. |
| 9,307,159 B2 * | 4/2016 | Kanamori ............. G02F 1/0136 |
| 9,582,751 B2 | 2/2017 | Bourrieres et al. |
| 9,773,141 B2 | 9/2017 | Kozicki |
| 9,790,538 B2 | 10/2017 | Berrada et al. |
| 9,836,633 B2 | 12/2017 | Kozicki |
| 10,074,000 B2 | 9/2018 | Kozicki |
| 10,223,567 B2 | 3/2019 | Kozicki |
| 10,282,480 B2 | 5/2019 | Murrah et al. |
| 10,467,447 B1 | 11/2019 | Kozicki |
| 10,503,890 B2 | 12/2019 | Cambou et al. |
| 10,558,172 B2 | 2/2020 | Kozicki |
| 10,810,731 B2 | 10/2020 | Kozicki |
| 11,170,190 B2 | 11/2021 | Kozicki |
| 11,430,233 B2 | 8/2022 | Kozicki |
| 11,875,501 B2 | 1/2024 | Kozicki |
| 2001/0027922 A1 | 10/2001 | Chen et al. |
| 2002/0004632 A1 | 1/2002 | Lindquist et al. |
| 2002/0055239 A1 | 5/2002 | Tuominen et al. |
| 2002/0126889 A1 | 9/2002 | Pikler et al. |

| | | |
|---|---|---|
| 2004/0026917 A1 | 2/2004 | Bauer et al. |
| 2004/0104802 A1 | 6/2004 | Becker et al. |
| 2004/0104807 A1 | 6/2004 | Ko |
| 2004/0174257 A1 | 9/2004 | Kuhns et al. |
| 2005/0275831 A1 | 12/2005 | Silver |
| 2006/0029855 A1 | 2/2006 | Ji et al. |
| 2006/0086901 A1 | 4/2006 | Price et al. |
| 2006/0146515 A1 | 7/2006 | Hwang et al. |
| 2006/0159329 A1 | 7/2006 | Joshi et al. |
| 2007/0090918 A1 | 4/2007 | Engstrom et al. |
| 2007/0132998 A1 | 6/2007 | Tang et al. |
| 2007/0275230 A1 | 11/2007 | Murphy et al. |
| 2008/0027651 A1 | 1/2008 | Sieknneier et al. |
| 2008/0179405 A1 | 7/2008 | Benderly |
| 2008/0219503 A1 | 9/2008 | Di Venuto et al. |
| 2008/0260941 A1 | 10/2008 | Jin |
| 2009/0017284 A1 | 1/2009 | Dionigi et al. |
| 2009/0186756 A1 | 7/2009 | Cheng et al. |
| 2009/0237660 A1 * | 9/2009 | Albrecht ............... G03B 17/12 |
| | | 356/364 |
| 2009/0242416 A1 | 10/2009 | Yun et al. |
| 2009/0258241 A1 | 10/2009 | Shiraishi et al. |
| 2009/0323959 A1 | 12/2009 | Hara |
| 2010/0007896 A1 | 1/2010 | Fishbaine |
| 2010/0164219 A1 | 7/2010 | Jeacock et al. |
| 2010/0193365 A1 | 8/2010 | Lopatin et al. |
| 2010/0216026 A1 | 8/2010 | Lopatin et al. |
| 2010/0284585 A1 | 11/2010 | Wang et al. |
| 2011/0000970 A1 | 1/2011 | Abraham |
| 2011/0143811 A1 | 6/2011 | Rodriguez |
| 2011/0205542 A1 | 8/2011 | Pendell Jones et al. |
| 2011/0253789 A1 | 10/2011 | Thiele et al. |
| 2011/0254117 A1 | 10/2011 | Kozicki |
| 2012/0080528 A1 | 4/2012 | Crowley |
| 2012/0169647 A1 | 7/2012 | Kuo et al. |
| 2012/0323787 A1 | 12/2012 | Nelsen |
| 2013/0022238 A1 | 1/2013 | Wood et al. |
| 2013/0026645 A1 | 1/2013 | Mohammed et al. |
| 2013/0088555 A1 | 4/2013 | Hanina |
| 2013/0088583 A1 | 4/2013 | Northcott et al. |
| 2013/0117078 A1 | 5/2013 | Weik, III et al. |
| 2013/0127959 A1 | 5/2013 | Hanina |
| 2013/0220413 A1 | 8/2013 | Kozicki et al. |
| 2013/0228821 A1 | 9/2013 | Kozicki et al. |
| 2014/0086474 A1 | 3/2014 | Le |
| 2014/0105449 A1 | 4/2014 | Caton et al. |
| 2014/0119612 A1 | 5/2014 | Wang et al. |
| 2014/0169647 A1 | 6/2014 | Ruszczycki et al. |
| 2014/0185891 A1 | 7/2014 | Schoennneyer et al. |
| 2014/0297545 A1 | 10/2014 | Prasad et al. |
| 2014/0379529 A1 | 12/2014 | Agasti et al. |
| 2015/0084984 A1 | 3/2015 | Tomii et al. |
| 2015/0247252 A1 | 9/2015 | Montemor et al. |
| 2017/0185880 A1 | 6/2017 | Lin et al. |
| 2018/0008967 A1 | 1/2018 | Yu et al. |
| 2019/0218707 A1 | 7/2019 | Pollini et al. |
| 2019/0262897 A1 | 8/2019 | Zhao et al. |
| 2020/0130066 A1 | 4/2020 | Zhao et al. |

FOREIGN PATENT DOCUMENTS

| | | |
|---|---|---|
| WO | WO 1998/048319 A1 | 10/1998 |
| WO | WO 2000/048196 A1 | 8/2000 |
| WO | WO 2007/102988 A2 | 9/2007 |
| WO | WO 2010/008567 A1 | 1/2010 |
| WO | WO 2010/077622 A1 | 7/2010 |
| WO | WO 2012/065076 A1 | 5/2012 |
| WO | WO 2012/065083 A1 | 5/2012 |
| WO | WO 2012/177845 A2 | 12/2012 |
| WO | WO 2014/165047 A1 | 10/2014 |
| WO | WO 2016/073910 A1 | 5/2016 |
| WO | WO 2017/062425 A1 | 4/2017 |
| WO | WO-2018232402 A1 * | 12/2018 .......... G06T 7/0012 |
| WO | WO 2019/126656 A2 | 6/2019 |
| WO | WO 2019/210129 A1 | 10/2019 |
| WO | WO 2020/117950 A1 | 6/2020 |

OTHER PUBLICATIONS

(56)　　　　　　References Cited

OTHER PUBLICATIONS

Al-Sid-Cheikh et al., "Synthesis and characterization of [110mAg]-nanoparticles with application to whole-body autoradiography of aquatic organisms," Appl. Radiat. Isot., 2011, 69(10):1415-1421.

Bae et al., "Biomimetic Microfingerprints for Anti-Counterfeiting Strategies," Advanced Materials, 2015, 27(12):2083-2089.

Balakrishnan et al., "A low power non-volatile memory element based on copper in deposited silicon oxide," 7th Annual Non-Volatile Memory Technology Symposium, 2006, pp. 104-110.

Baloukas, "Thin Film-Based Optically Variable Security Devices: From Passive to Active," Ecole polytechnique de Montreal, Aug. 1, 2012, pp. 1-249, XP055876886.

Berthier et al., "Multiscaled polarization effects in Suneve coronata (Lepidoptera) and other insects: application to anti-counterfeiting of banknotes," Applied Physics A, Oct. 11, 2006, 86:123-130.

BonAppetit.com [online], "The 15 Most Common Counterfeit Foods—and How to Identify Them," Feb. 4, 2014, retrieved on Dec. 13, 2021, retrieved from URL <https://www.bonappetit.com/entertaining-style/trends-news/slideshow/counterfeit-foods>, 12 pages.

Butera, "Fractal Electrodes," NNIN REU Research Accomplishments, 2012:176-177.

CDC.gov [online], "Multistate Outbreak of E. coli 0157:H7 Infections Linked to Romaine Lettuce (Final Update)," Jun. 28, 2018, retrieved Dec. 13, 2021, retrieved from URL <https://www.cdc.gov/ecoli/2018/o157h7-04-18/index.html>, 10 pages.

Chaudhuri et al., "Texture Segmentation Using Fractal Dimension," IEEE Transactions on Pattern Analysis and Machine Intelligence, 1995, 17(1):72-77.

Chen et al., "Polarization-based method for object surface orientation information in passive millimeter-wave imaging," IEEE Photonics Journal, Feb. 2016, 8(1):1-12.

Chen et al., "Ultrasonically Assisted Synthesis of 3D Hierarchical Silver Microstructures," The Journal of Physical Chemistry C, 2009, 113(44):19258-19262.

Cheung et al., "Implementation issues in RFID-based anti-counterfeiting systems," Computers in Industry, Apr. 7, 2011, 62(7):708-718.

Chi et al., "Consistency penalized graph matching for image-based identification of dendritic patterns," IEEE Access, Jun. 26, 2020, 8:11863-118637.

Devadas et al.,"Design and Implementation of PUF-Based "Unclonable" RFID ICs for Anti-Counterfeiting and Security Applications," 2008 IEEE International Conference on RFID, Apr. 16-17, 2008:58-64.

Ding et al., "Tuning the surface enhanced Raman scattering activity of gold nanocubes by silver coating," Applied Surface Science, 2015, 357:487-492.

Edwards et al., "Reconfigurable Memristive Device Technologies," Proceedings of the IEEE, Jul. 2015, 103(7):1004-1033.

EurekAlert.org [online], "Stealth Mark licenses ORNL invisible micro-taggant for anticounterfeiting applications," Jun. 25, 2018, retrieved on Dec. 13, 2021, retrieved from URL <https://www.eurekalert.org/pub_releases/2018-06/drnl-sm1062518.php>, 3 pages.

Extended European Search Report in International Appln. No. 18817477.5, dated Feb. 16, 2021, 9 pages.

Extended European Search Report in International Appln. No. 21867701.1, dated Sep. 9, 2024, 9 pages.

Fleury et al., "Rapid electroplating of insulators," Nature, Apr. 2002, 416(6882):716.

Forbes.com [online], "The 2008 Milk Scandal Revisited," Jul. 16, 2014, retrieved on Dec. 13, 2021, retrieved from URL <https://www.forbes.com/sites/yanzhonghuang/2014/07/16/the-2008-milk-scandal-revisited/#2786cbee4105>, 3 pages.

Han et al., "Lithographically Encoded Polymer Microtaggant Using High-Capacity and Error-Correctable QR Code for Anti-Counterfeiting of Drugs," Advanced Materials, 2012, 24(44):5924-5929.

Han et al., "Magnetic Silver Hybrid Nanoparticles for Surface-Enhanced Resonance Raman Spectroscopic Detection and Decontamination of Small Toxic Molecules," ACS Nano, 2013, 7(4):3212-3220.

Heer et al., "Single-chip Microelectronic System to Interface with Living Cells," Biosensors and Bioelectronics, 2007, 22(11):2546-3553.

Hu et al., "Photonic anti-counterfeiting using structural colors derived from magnetic-responsive photonic crystals with double photonic bandgap heterostructures," Journal of Material Chemicals, 2012, 22:11048-11053.

IBM.com [online], "Pairing AI with Optical Scanning for Real-World Product Authentication," May 23, 2018, retrieved on Dec. 13, 2021, retrieved from URL <https://www.ibm.com/blogs/research/2018/05/ai-authentication-verifier/>, 8 pages.

Ilic et al., "Synchronized Secrets Approach for RFID-enabled Anti-Counterfeiting," Internet of Things Conference 2008 (Zurich, CH), retrieved on May 15, 2013, dated Jan. 1, 2008, retrieved from the URL: <http://www.stop-project.eu/Portals/1/publicati ons/080128 Demo_IoT_v07.pdf>, 4 pages.

ImageJ.net [online], "Analyze Skelton," available on or before Jan. 17, 2018, via Internet Archive: Wayback Machine URL <https://web.archive.org/web/20180117122909/https://imagej.net/AnalyzeSkeleton>, retrieved on Feb. 28, 2020, from URL <https://imagej.net/AnalyzeSkeleton>, 14 pages.

Imai et al., "Anisotropic Growth of Silver Crystals with Ethylenediamine Tetraacetate and Formation of Planar and Stacked Wires," Crystal Growth & Design, 2005, 5(3):1073-1077.

Independent.co.uk [online], "Cracking down on China's dangerous fake food sector," Aug. 7, 2017, retrieved on Dec. 13, 2021, retrieved from URL <https://www.independent.co.uk/news/world/asia/china-fake-food-sector-unlicensed-products-knock-offs-supply-chain-contamination-public-health-a7880341.html>, 7 pages.

International Search Report and Written Opinion for International Application No. PCT/US2019/029284, dated Aug. 1, 2019, 9 pages.

Je et al., "In situ tuning of a MEMS microphone using electrodeposited nanostructures," Journal of Micromechanics and Microengineering, 2009, 19 035015, 8 pages.

Jordan et al., "Identifying Counterfeit Medicines with Industry-Suitable Technologies," Pharmaceutical Engineering, Official Magazine of ISPE, Anti-Counterfeiting Technologies, May/Jun. 2012, 32(3), 7 pages.

Katsuki et al., "High Magnetic Field Effect on the Growth of 3-Dimensional Silver Dendrites," Chemistry Letters, 2002, 31(12):1186-1187.

Koushanfar, "Provably Secure Active IC Metering Techniques for Piracy Avoidance and Digital Rights Management," IEEE Transactions on Information Forensics and Security, Feb. 1, 2012, 7(1):51-63.

Kozicki et al., "Electrodeposit formation in solid electrolytes," 7th Annual Non-Volatile Memory Technology Symposium, 2006:111-115.

Kozicki et al., "Flow regulation in microchannels via electrical alteration of surface properties," Superlattices and Microstructures, Sep. 1, 2003, 34(3-6):467-473.

Kozicki et al., "Information storage using nanoscale electrodeposition of metal in solid electrolytes," Superlattices and Microstructures, Sep. 1, 2003, 34(3-6):459-465.

Kozicki et al., "Nanoscale effects in devices based on chalcogenide solid solutions," Superlattices and Microstructures, 2000, 27(5/6):485-488.

Kozicki et al., "Nanostrcuture of solid electrolytes and surface electrodeposits," Physica E, 2003, 19(1-2):161-166.

Kuo et al., "Formation of Silver Nanoparticles under Structured Amino Groups in Pseudo-dendritic Poly(allylamine) Derivatives," J. Phys. Chem. B, 2003, 107(41):11267-11272.

Lee et al., "Preparation of Silver Dendritic Nanoparticles Using Sodium Polyacrylate in Aqueous Solution," Chemistry Letters, Jan. 2004, 33(2):118-119.

Lee et al., "Universal process-inert encoding architecture for polymer microparticles," Nature Materials, 2014, 13(5):524.

Lee, "Micro-Technology for Anti-Counterfeiting," Microelectronic Engineering, 2000, 53:513-516.

(56)            References Cited

OTHER PUBLICATIONS

Levin et al., "Senate Armed Services Committee Releases Report on Counterfeit Electronic Parts," May 21, 2012, retrieved on Feb. 28, 2020, retrieved from URL <https://www.armed-services.senate.gov/press-releases/senate-armed-services-committee-releases-report-on-counterfeit-electronic-parts>, 4 pages.

Liu et al., "Controllable Synthesis of Silver Dendrites via an Interplay of Chemical Diffusion and Reaction," Industrial & Engineering Chemistry Research, 2016, 55(30):8319-8326.

Liu et al., "Fabrication of Infrared Left-Handed Metamaterials via Double Template-Assisted Electrochemical Deposition," Advanced Materials, Jun. 4, 2008, vol. 20, No. 11, pp. 2050-2054, XP055876818.

Liu et al., "Multiple Pass-Band Optical Left-Handed Metamaterials Based on Random Dendritic Cells," Advanced Functional Materials, 2008, 18(21):3523-3528.

Lowe, "Object recognition from local scale-invariant features," Proceedings of the International Conference on Computer Vision 2, Sep. 1999:1150-1157.

Mitkova et al., "Morphology of electrochemically grown silver deposits on silver-saturated Ge—Se thin films," Journal of Non-Crystalline Solids, 2003, 326&327:425-429.

NaturalNews.com [online], "Sticky PLU Labels on Fruit Provide Useful Health Information," Jul. 28, 2008, retrieved on Dec. 13, 2021, retrieved from URL <http://www.naturalnews.com/023711_fruit_labels_health.html>, 10 pages.

Ngo et al., "Paper surfaces functionalized by nanoparticles," Advances in Colloid and Interface Science, 2011, 163(1):23-38.

Nguyen-Thi et al., "On the interest of synchrotron X-ray imaging for the study of solidification in metallic alloys," Comptes Rendus-Physique, Jan. 20, 2012, 13(3):237-245.

Nocke et al., "Dielectrophoretic alignment of polymer compounds for thermal sensing," Sensors and Actuators A: Physical, Nov. 1, 2009, 156(1):164-170.

Organization for Economic Co-operation and Development, "Global trade in fake goods worth nearly half a trillion dollars a year—OECD & EUIPO," 2016, retrieved Mar. 5, 2020, retrieved from URL <https://www.oecd.org/industry/global-trade-in-fake-goods-worth-nearly-half-a-trillion-dollars-a-year.htm>, 2 pages.

PopularMechanics.com, "The Pentagon Uses Plant DNA to Catch Counterfeit Parts," Nov. 21, 2016, retrieved on Dec. 13, 2021, retrieved from URL <https://www.popularmechanics.com/military/research/a23988/plant-dna-pentagon-counterfeit/>, 6 pages.

Psilodimitrakopoulos et al., "Quantitative Imaging of Microtubule Alteration as an Early Marker of Axonal Degeneration after Ischemia in Neurons," Biophysics Journal, Mar. 2013, 104(5):968-975.

ResearchandMarkets.com [online], "Global Brand Counterfeiting Report, 2018," available on or before May 28, 2019, via Internet Archive: Wayback Machine URL <https://web.archive.org/web/20190528093101/https://www.researchandmarkets.com/research/7j7l2n/global_brand?w=4>, retrieved on Feb. 28, 2020, URL <https://www.researchandmarkets.com/research/7j7l2n/global_brand?w=4>, 12 pages.

Riley, "How Barcodes Can Help Fight Food Fraud," Food Engineering, Sep. 2017, retrieved from URL <https://www.foodengineeringmag.com/articles/96990-how-barcodes-can-help-fight-food-fraud>, 3 pages.

Roysam et al., "Farsight: A Divide and Conquer Methodology for Analyzing Complex and Dynamic Biological Microenvironments," Microscopic Image Analysis for Life Science Applications; Atech House Series Bioinformatics & Biomedical imaging, Jan. 1, 2008:115-152.

Ruffato et al., "Design, fabrication and characterization of Computer Generated Holograms for anti-counterfeiting applications using OAM beams as light decoders," Scientific Reports, 2017, 7(18011):1-13.

Russo et al., "Study of Multilevel Programming in Programmable Metallization Cell (PMC) Memory," IEEE Transactions on Electron Devices, May 1, 2009, 56(5):1040-1047.

Sato-Berrú et al., "Silver nanoparticles synthesized by direct photoreduction of metal salts. Application in surface-enhanced Raman spectroscopy," J. Raman Spectrosc., Oct. 20, 2008, 40(4):376-380.

Sawada et al., "Dendritic and Fractal Patterns in Electrolytic Metal Deposits," Physical Review Letters, Mar. 24, 1986, 56(12):1260-1263.

Schindelin et al., "Fiji: an open-source platform for biological-image analysis," Nature Methods, 2012, 9(7):676-682.

seas.harvard.edu [online], "Technique makes holograms highly efficient, secure," Harvard School of Engineering and Applied Sciences, May 13, 2016, retrieved on Jan. 30, 2017, retrieved from internet: <URL:https://www.seas.harvard.edu/news/2016/05/technique-makes-holograms-highly-efficient-secure>, 4 pages.

Sekerka, "A Stability Function for Explicit Evaluation of the Mullins-Sekerka Interface Stability Criterion," Journal of Applied Physics, 1965, 36(1):264-268.

Serre et al., "A Theory of Object Recognition: Computations and Circuits in the Feedforward Path of the Ventral Stream in Primate Visual Cortex," Computer Science and Artificial Intelligence Laboratory Technical Report, MIT-CSAIL-TR-2005-082, Dec. 19, 2005, 131 pages.

Skoric et al., "Experimental Hardware for Coating PUFs and Optical PUFs," In: "Security with Noisy data" by Pim Tuyls et al., Jan. 1, 2007, pp. 256-268.

Smafield et al., "Automatic Dendritic Length Quantification for High Throughput Screening of Mature Neurons," Neuroinformatice, Humana Press Inc., Apr. 9, 2015, 13(4):443-458.

Socol et al., "Suspensive Electrode Formation in Pulsed Sonoelectrochemical Synthesis of Silver Nanoparticles," Langmuir, 2002, 18(12):4736-4740.

Spectrum.ieee.org [online], "How Blockchain Technology Could Track and Trace Food From Farm to Fork," Aug. 29, 2018, retrieved on Dec. 13, 2021, retrieved from URL <http://theinstitute.ieee.org/resources/standards/how-blockchain-technology-could-track-and-trace-food-from-farm-to-fork>, 8 pages.

Tanaka, "Factors leading to ionic migration in lead-free solder," Oct. 1, 2002, retrieved on Feb. 26, 2019, retrieved from URL <https://www.test-navi.com/eng/report/pdf/FactorsLeadingToIonicMigrationInLead-freeSolder.pdf>, 9 pages.

TruTags.com [online], "Counterfeiting," available on or before Nov. 2017, retrieved on Dec. 13, 2021, retrieved from URL <https://trutags.com/anti-counterfeiting-solution/>, 6 pages.

Tuyls et al., "Anti-Counterfeiting," Security with Noisy data, Jan. 1, 2007:290-312.

Valehi et al., "A graph matching algorithm for user authentication in data networks using image-based physical unclonable functions," 2017 Computing Conference (London, UK, Jul. 18-20, 2017), 2017:863-870.

Verwer et al., "Descriptive and comparative analysis of geometrical properties of neuronal tree structures," Journal of Neuroscience Methods, Oct. 1, 1986, 18(1-2):179-206.

Wang, et al., "Synthesis of silver dendritic nanostructures protected by tetrathiafulvalene," Chemical Communications, 2002, 12:1300-1301.

WHO.int [online], "Food Safety," 2017, retrieved on Dec. 12, 2021, retrieved from URL <https://www.who.int/news-room/fact-sheets/detail/food-safety>, 7 pages.

Wikipedia.org [online], "Photographic developer," Wikipedia, Oct. 14, 2018, retrieved Mar. 5, 2020, retrieved from URL <https://en.wikipedia.org/w/index.php?title=Photographic_developer&oldid=864027112>, 6 pages.

Witten et al., "Diffusion-Limited Aggregation, a Kinetic Critical Phenomenon," Physical Review Letters, Nov. 9, 1981, 47(19):1400-1403.

Xiao et al., "Novel Ultrasonically Assisted Templated Synthesis of Palladium and Silver Dendritic Nanostructures," Advanced Materials, 2001, 13(24):1887-1891.

Yan et al., "Application of RFID and Internet of Things in Monitoring and Anti-Counterfeiting for Products," 2008 International Seminar on Business and Information Management, IEEE Computer Society, Dec. 19, 2008:392-395.

(56)  References Cited

OTHER PUBLICATIONS

Zhao et al., "Photochemical synthesis of dendritic silver nano-particles for anti-counterfeiting," Journal of Materials Chemistry C, vol. 7, Apr. 29, 2019, pp. 6099-6104.

Zhao et al., "Simple and eco-friendly preparation of silver films coated on copper surface by replacement reaction," Applied Surface Science, 2012, 258(19):7430-7434.

Zhao, "Bottom-up fabrication methods of optical metamaterials," Journal of Materials Chemistry, Jan. 1, 2012, vol. 22, No. 19, p. 9439-9449, XP055876820.

Zhou et al., "A Novel Ultraviolet Irradiation Photoreduction Technique for the Preparation of Single-Crystal Ag Nanorods and Ag Dendrites," Adv. Mater., 1999, 11(10):850-852.

* cited by examiner

AUTHENTICATION OF DENDRITIC STRUCTURES

CROSS-REFERENCE TO RELATED APPLICATION

This application is a National Stage Application of International Application No. PCT/US2021/049929, filed Sep. 10, 2021, which claims the benefit of U.S. application Ser. No. 63/076,708 filed on Sep. 10, 2020, both of which are incorporated herein by reference in their entirety.

TECHNICAL FIELD

This invention relates to authentication of a dendritic structure based on the analysis of reflected light from a surface of the dendritic structure that is illuminated with polarized or unpolarized light.

BACKGROUND

A dendritic structure, or dendrite, is a structure that develops with a typical multi-branching, Tree-like form. Dendritic patterns are common in nature and are seen in diverse phenomena such as snowflake formation and lightning. Dendritic crystallization forms a natural fractal pattern. A fractal is generally defined as a rough or fragmented geometric shape that can be subdivided into parts, each of which is (at least superficially) a reduced-size copy of the whole, a property called self-similarity. This self-similarity leads to a fine structure at arbitrarily small scales. Because they appear similar (but not identical) at all levels of magnification, fractals are often considered to be infinitely complex. In practice, however, the finest observable levels of structure are typically limited by physical and/or chemical constraints.

SUMMARY

This disclosure describes systems and methods for assessing the authenticity of dendrites or dendritic structures. The authentication is based on the analysis of reflected light from the surface of a dendrite or dendritic structure that is illuminated with polarized or unpolarized light. As used herein, a dendrite is "authentic" if variations in reflected light from a dendrite illuminated with polarized or unpolarized radiation at different polarization angles exceed a threshold value. Examples of authentic dendrites include dendrites that include facets (e.g., dendrites, such as metallic dendrites, formed by electrodeposition), dendrites that have compositional variations within a volume of material (e.g., particulate material, such as metal particles, within a binder), and dendrites that have phase separated regions. The dendrite can be formed on the substrate a metallic dendrite formed by electrodeposition) or placed on the substrate after it is formed. The dendrite can be formed using multi-fluid systems and methods in which a first fluid is provided between a surface of a first substrate and a surface of a second substrate, and introducing a second fluid between the surface of the first substrate and the surface of the second substrate. In some cases, the first fluid includes particulate material, such as metallic particles (e.g., metal flakes).

These systems and methods are effective for dendrites with or without a protective layer transparent to the wavelength(s) of light used. A dendrite that is not authentic typically has a flat and featureless surface (e.g., a photographic image of a dendrite) or a three-dimensional structure without facets or compositional variation (e.g., a dendrite cast from a mold). For dendrites that are not authentic, the degree of linear polarization (DoLP) and the angle of linear polarization (AoLP) of the reflected light depend at least in part on material parameters, particularly refractive index and Brewster's angle, and are typically uniform across the sample area. In the case of an authentic dendrite (e.g., an electrodeposited metallic dendrite, a dendrite with an appropriate compositional variation, a dendrite formed using multi-fluid systems and methods, or other materials and processes that form dendrites) extending from a surface of the substrate on which it is deposited, the morphology or composition of the surface typically causes slight changes in both DoLP and AoLP as a function of the location on the dendrite from which the light is reflected), so that a two-dimensional representation of these parameters provides a unique optically derived signature of the dendrite that cannot easily be reproduced by other means.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a method of assessing the authenticity of a dendrite on a substrate, the method comprising:

illuminating the dendrite and the substrate with radiation;

obtaining a first image of the dendrite on the substrate at a first polarization angle;

obtaining a second image of the dendrite on the substrate at a second polarization angle;

assessing a difference in intensity of a multiplicity of corresponding pixels of the candidate structure in the first image and the second image; and if the difference in intensity of each pair of pixels of the multiplicity of corresponding pixels exceeds a preselected value, identifying the dendrite as authentic.

Embodiment 2 is the method of embodiment 1, wherein illuminating the dendrite with radiation comprises illuminating the dendrite with an illuminator or ambient light.

Embodiment 3 is the method of embodiments 1 or 2, wherein the radiation is in the visible range.

Embodiment 4 is the method of any one of embodiments 1-3, wherein obtaining the first image, the second image, or both comprises Obtaining an image with a camera.

Embodiment 5 is the method of embodiment 4, wherein obtaining the first image, the second image, or both comprises operatively coupling the camera to two or more polarizers.

Embodiment 6 is the method of embodiment 4, wherein the camera is a polarization camera comprising polarizers.

Embodiment 7 is the method of any one of embodiments 1-6, wherein a difference between the first polarization angle and the second polarization angle is at least 10°.

Embodiment 8 is the method of any one of embodiments 1-7, further comprising obtaining one or more additional images of the dendrite at one or more additional polarization angles.

Embodiment 9 is the method of embodiment 8, wherein the one or more additional polarization angles comprise a third polarization angle.

Embodiment 10 is the method of embodiment 9, where the first polarization angle is 0°, the second polarization angle is 90°, and the third polarization angle is 135°.

Embodiment 11 is the method of embodiment 8, wherein the one or more additional polarization angles comprise a third polarization angle and a fourth polarization angle.

Embodiment 12 is the method of embodiment 11, wherein the first polarization angle is 0°, the second polarization angle is 45°, the third polarization angle is 90°, and the fourth polarization angle is 135°.

Embodiment 13 is the method of any one of embodiments 1-12, further comprising obtaining an additional image of the dendrite with an unfiltered light component.

Embodiment 14 is the method of any one of embodiments 1-13, wherein the radiation is unpolarized.

Embodiment 15 is the method of any one of embodiments 1-13, wherein the radiation is polarized.

Embodiment 16 is the method of any one of embodiments 1-15, wherein the preselected value is determined using a machine learning technique based on a multiplicity of images of authentic and non-authentic dendrites taken over a multiplicity of polarization angles.

Embodiment 17 is the method of embodiment 16, wherein the preselected value is based at least in part on one or more of a composition of the dendrite, a morphology of the dendrite, and a location of each pair of pixels with respect to the dendrite.

Embodiment 18 is the method of any one of embodiments 1-17, wherein the preselected value corresponds to, for each pair of pixels, a 5%, 10%, or 15% difference in intensity.

Embodiment 19 is the method of any one of embodiments 1-18, wherein the dendrite is a metallic dendrite or a multi-fluid dendrite.

Embodiment 20 is the method of embodiment 19, wherein the multi-fluid dendrite comprises metallic particles.

Embodiment 21 is a method of assessing the authenticity of a dendrite on a substrate, the method comprising:

illuminating the dendrite and the substrate with radiation;

obtaining a multiplicity of images of the dendrite on the substrate at a multiplicity of polarization angles;

obtaining a degree of linear polarization image, an angle of linear polarization image, or both from the multiplicity of images;

assessing a difference between an intensity of a pixel corresponding to the substrate and a pixel corresponding to the dendrite in the degree of linear polarization image, the angle of linear polarization image, or both; and if the difference exceeds a preselected value, identifying the dendrite as authentic.

In Embodiment 21, the multiplicity of polarization angles comprises two or more polarization angles.

Embodiment 22 is the method of embodiment 21, where the multiplicity of polarization angles comprise 0°, 90°, and 135°.

Embodiment 23 is the method of embodiment 21 or 22, wherein multiplicity of polarization angles comprise 0°, 45°, 90°, and 135°.

Embodiment 24 is the method of any one of embodiments 21-23, further comprising obtaining an additional image of the dendrite on the substrate with an unfiltered light component.

Embodiment 25 is the method of any one of embodiments 21-24, wherein the multiplicity of images comprises a first image obtained at a first polarization angle and a second image obtained at a second polarization angle.

Embodiment 26 is the method of embodiment 25, wherein a difference between the first polarization angle and the second polarization angle is at least 10°.

Embodiment 27 is the method of any one of embodiments 21-26, wherein the dendrite comprises a coating transparent to the polarized or unpolarized radiation.

Embodiment 28 is the method of any one of embodiments 21-27, wherein the intensity of the pixels corresponding to the dendrite in the degree of linear polarization image, the angle of linear polarization image, or both is substantially uniform.

Embodiment 29 is the method of any one of embodiments 21-28, further comprising comparing the degree of linear polarization image, an angle of linear polarization image, or both with an unfiltered image of the dendrite and the substrate.

Embodiment 30 is the method of any one of embodiments 21-29, wherein the dendrite is a metallic dendrite or a multi-fluid dendrite.

Embodiment 31 is the method of embodiment 30, wherein the multi-fluid dendrite comprises metallic particles.

Embodiment 32 is the method of any one of embodiments 21-31, wherein the radiation is polarized.

Embodiment 33 is the method of any one of embodiments 21-31, wherein the radiation is unpolarized.

Embodiment 34 is the method of any one of embodiments 21-33, wherein the preselected value is determined using a machine learning technique based on a multiplicity of images of authentic and non-authentic dendrites taken over a multiplicity of polarization angles.

Embodiment 35 is the method of embodiment 34, wherein the preselected value is based at least in part on one or more of a composition of the dendrite, a morphology of the dendrite, and a location of each pair of pixels with respect to the dendrite.

Embodiment 66 is the method of any one of embodiments 21-35, wherein the preselected value corresponds to, for each pair of pixels, a 5%, 10%, or 15% difference in intensity.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
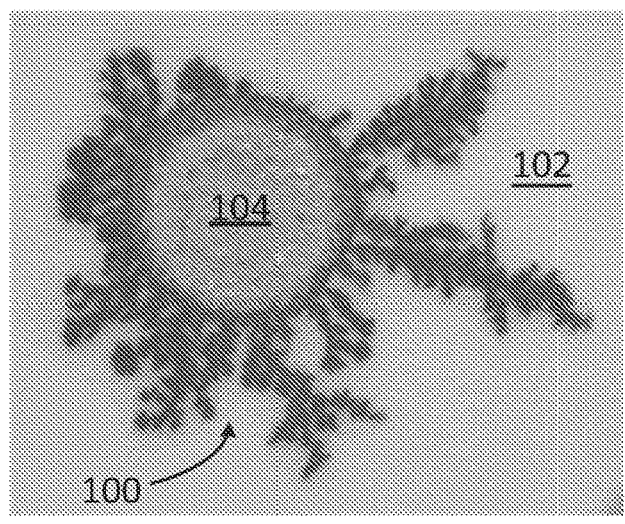
FIG. 1 is an image of a silver dendrite grown on photographic paper.

This disclosure describes systems and methods for the authentication of a dendrite or dendritic structure. "Dendrite" and "dendritic structure" are used interchangeably herein. As described herein, each dendritic structure has a plurality of members extending away from a common point to form a stochastically branched arrangement of the members, wherein regions of the dendritic structure are stochastically self-similar to the entire dendritic structure. A maximum dimension of the dendrites is typically in a range of 5 mm to 5 cm.

Metallic (i.e., metal or metal-containing) dendrites can be formed by electrodeposition in an ion conductor (i.e., an electrolyte) by generating an ion current in the ion conductor and using the flow of ions to build up the dendritic structure in or on the ion conductor via electrochemical processes. Metallic dendrites can include copper or silver. The ion conductor can be liquid, gel, or solid, or a combination thereof. Additional details regarding metallic dendrites are found in U.S. Pat. No. 10,074,000, which is incorporated herein by reference.

Multi-fluid dendrites can be formed by providing a first fluid between a surface of a first substrate and a surface of a second substrate and introducing a second fluid between the surface of the first substrate and the surface of the second substrate. The second fluid is in direct contact with the first fluid at a formation temperature, and a viscosity of the first fluid at the formation temperature exceeds a viscosity of the second fluid at the formation temperature. Formation of multi-fluid dendrites further includes separating the first substrate and the second substrate to yield a dendrite comprising the first fluid on the surface of the first substrate. The first fluid is hardened (e.g., by removing a solvent in the first fluid or polymerizing the first fluid) to solidify the dendrites. In one example, the first fluid includes (meth)acrylate monomers, (meth)acrylic resin, or both. The first fluid can also include particles that reflect light, such as metallic particles, glass particles, or the like. The second fluid can be a gas (e.g., air). In some examples, the resulting dendrites are acrylic or steel-reinforced acrylic.

As used herein, an "authentic dendrite" generally refers to a dendrite for which variations in reflected light from the dendrite illuminated with polarized or unpolarized radiation at different polarization angles exceed a threshold value. Additional details relating to polarized scanning of dendritic structures are found in U.S. Patent Publication No. 2020/0117882, which is incorporated herein by reference. The dendrite may be formed on a substrate (e.g., a metallic dendrite formed by electrodeposition, or a multi-fluid dendrite) or placed on the substrate after it is formed. The authentication is based on the analysis of reflected light from the surface of the dendrite.

The dendrite is illuminated with polarized or unpolarized light (e.g., from an illuminator or from ambient lighting), and the reflected light is analyzed using polarization optics. A polarization camera can be used as the imaging device. A unique optical signature is obtained for each authentic dendrite.

Systems and methods described herein are effective for dendrites with or without a protective layer transparent to the wavelength(s) of light used. For a flat and featureless surface, the degree of linear polarization (DoLP) and the angle of linear polarization (AoLP) of the reflected light depend at least in part on material parameters, particularly refractive index and Brewster's angle, and are typically uniform across the sample area. In the case of an authentic dendrite (e.g., an electrodeposited metallic dendrite, a dendrite with an appropriate compositional variation, a multi-fluid dendrite, or other materials and processes that form dendrites), the micro-roughness of the surface typically causes slight changes in both DoLP and AoLP as a function of location on the dendrite from which the light is reflected, so that a two-dimensional representation of these parameters provides a unique optically derived signature of the dendrite that cannot easily be reproduced by other means.

In polarization theory, the Stokes Vector elements are defined as:

$$S = \begin{bmatrix} S_0 \\ S_1 \\ S_2 \\ S_3 \end{bmatrix} = \begin{bmatrix} P_H + P_V \\ P_H - P_V \\ P_{45} - P_{135} \\ P_R - P_L \end{bmatrix}, \tag{1}$$

where the flux measurements P through polarizing elements are:

$P_H$ horizontal linear polarizer (0°)
$P_V$ vertical linear polarizer (90°)
$P_{45}$ 45° linear polarizer
$P_{135}$ 135° linear polarizer
$P_R$ right circular polarizer
$P_L$ left circular polarizer.

For linearly polarized light, the degree of linear polarization (DoLP) and the angle of linear polarization (AoLP) can be calculated by the following equations:

$$DoLP = \frac{\sqrt{S_1^2 + S_2^2}}{S_0} \tag{2}$$

$$AoLP = \frac{1}{2}\arctan\left(\frac{S_2}{S_1}\right) \tag{3}$$

Both DoLP and AoLP are dependent on the material that is reflecting the light into the polarizing elements and can be influenced by the nature of the surface.

In one implementation, these measurements are performed with a camera and a number of polarizing elements that are sequentially placed between the object being analyzed (i.e., the dendrite) and the camera that is used to determine flux (via intensity). In one implementation, the polarizing elements are coupled to a wheel or a strip and mechanically swapped. In another implementation, these measurements are performed using a polarization camera with polarizing elements built into the imaging sensor). An image of the dendrite is typically obtained at two or more polarization angles. One example includes two polarization angles greater than 10° apart. Another example includes three polarization angles (e.g., 0°, 90°, and 135°) and an unfiltered light component. Yet another example includes four polarization angles. Angles of 0°, 45°, 90°, and 135° can be used the Stokes Vector calculations; however, other combinations are possible.

The images are processed with software configured to assess a change in intensity for a multiplicity of corresponding pixels, where "corresponding pixels" refers to the set of pixels corresponding to the same location on the dendrite (or within, for example, a radius of one to three pixels), with each corresponding pixel associated with an image taken at a different polarization angle. In one example, the multiplicity of pixels is 1000 pixels and there are images at four different polarization angles, yielding 1000 sets of corresponding pixels, with four pixels in each set, all of which are associated with a specific location in the dendrite (i.e., a pixel in each image that corresponds to the same location on the dendrite). A difference in intensity for corresponding pixels refers to an intensity difference for each pair of pixels in each pixel set (e.g., six intensity differences for a set of four pixels).

If these intensity changes are within an expected range (or exceed a preselected value) and spatial distribution (e.g., a radius of one to three pixels) for the dendrite being imaged (e.g., electrodeposited metallic dendrites, dendrites with appropriate compositional variations, dendrites formed using multi-fluid systems and methods, or dendrites formed with other materials or processes), the dendrite can be confirmed as genuine (i.e., authentic). A preselected value of intensity change (e.g., a difference in intensity of each pair of pixels of corresponding pixels obtained in images at different polarization angles) can be determined using machine learning techniques trained using multiple images of genuine (authentic) and fake (not authentic) dendrites taken over a multiplicity of polarization angles. The preselected value is based at least in part on a composition of the dendrite, a morphology of the dendrite, and a location of each pixel set with respect to the dendrite. In one example, the preselected value corresponds to, for each pair of pixels in each pixel set, at least a 10% difference in intensity, where the difference in intensity is calculated by the difference of two measured intensities at two polarization angles (e.g., (I1–I2)) and dividing this difference by the sum of these intensities (e.g., (I1–I2)/(I1+I2)).

If there is little or no change in intensity at each pixel on the pattern for the different polarization angles (i.e., if the change in intensity does not meet or exceed the preselected value for each pair of pixels in each pixel set), it is likely that the dendrite is not genuine (i.e., not authentic). A preselected value of intensity difference (e.g., a difference in intensity of each pair of pixels for each pixel set) can be determined using machine learning techniques trained using multiple images of genuine (authentic) and fake (not authentic) dendrites taken over a multiplicity of polarization angles. The preselected value is based at least in part on one or more of a composition of the dendrite, a morphology of the dendrite, and a location of the pixel in each pixel set with respect to the dendrite. Preselected values for the difference in intensity include, for example, 5%, 10%, or 15%.

Figure 2A:
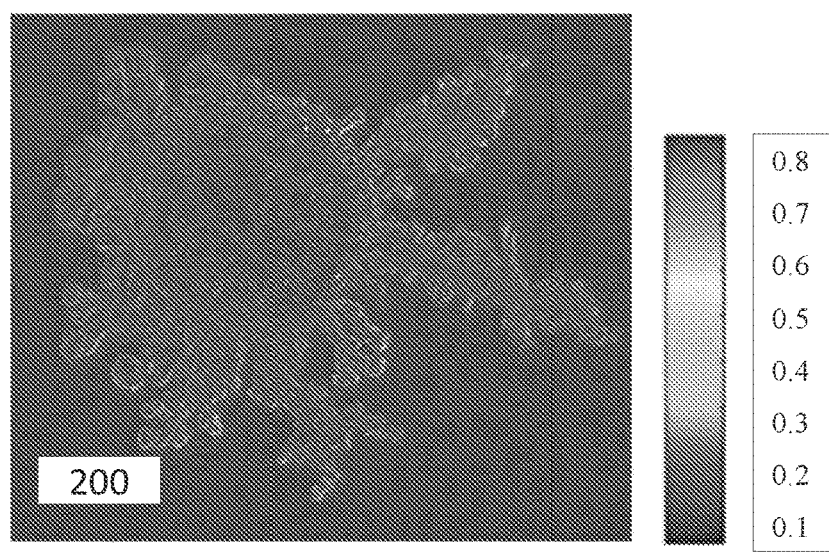
FIG. 2A is a degree of linear polarization (DoLP) image of the dendrite of FIG. 1.
Figure 2B:
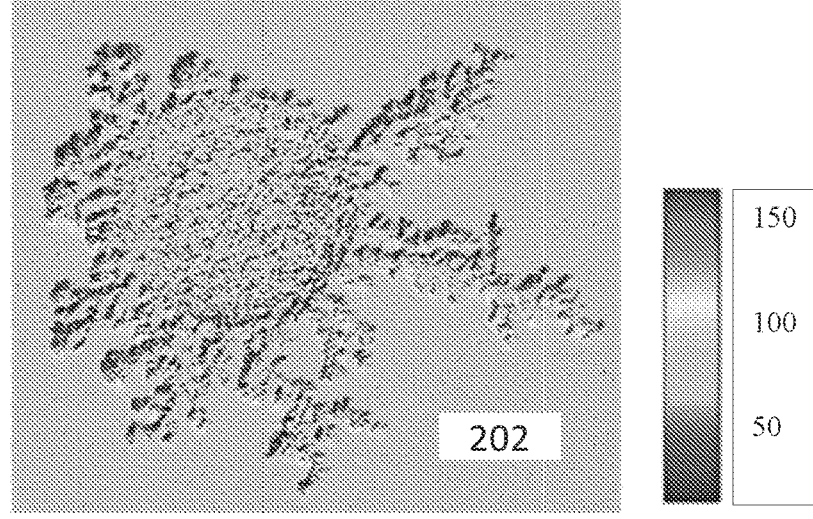
FIG. 2B is an angle of linear polarization (AoLP) image of the dendrite of FIG. 1.

FIG. 1 is an image of a silver dendrite 100 grown on photographic paper 102. The silver dendrite 100 is formed on screen-printed silver electrode 104. FIGS. 2A and 2B are images showing the degree of linear polarization (DoLP) and the angle of linear polarization (AoLP), respectively, of dendrite 100. The colors in the scale bars correspond to the degree (from dark blue (0) to deep red (1)) and angle (from dark blue (0°) to deep red (180°)) of linear polarization. These images were obtained using a polarization camera. The relief of the electrodeposited structure is emphasized in the DoLP image 200 with the photographic paper background giving a uniform value around 0.1 and the edges of the dendritic pattern giving a value close to 0.5. The AoLP image 202 is even more distinctive with the background giving a fairly uniform value close to 60° and the edges of the pattern ranging from less than 50° to over 100°. Both of images 200, 202 are unique to this electrodeposited pattern and can be used to authenticate it and to differentiate it from, for example, a photographic copy, particularly when used in conjunction with the unfiltered image as shown in FIG. 1. Note that the use of 0°, 45°, 90°, and 135° polarizing filters can be needed for Stokes Vector calculations that lead to accepted values of DoLP and AoLP, as other polarization angles can be used to yield a unique polarization signature.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of assessing the authenticity of a dendrite on a substrate, the method comprising:
   illuminating the dendrite and the substrate with radiation;
   obtaining a first image of the dendrite on the substrate at a first polarization angle;
   obtaining a second image of the dendrite on the substrate at a second polarization angle;
   assessing a difference in intensity of a multiplicity of corresponding pixels of the candidate structure in the first image and the second image; and
   if the difference in intensity of each pair of pixels of the multiplicity of corresponding pixels exceeds a preselected value, identifying the dendrite as authentic,
   wherein the preselected value is determined using a machine learning technique based on a multiplicity of images of authentic and non-authentic dendrites taken over a multiplicity of polarization angles.

2. The method of claim 1, wherein the radiation is in the visible range.

3. The method of claim 1, wherein obtaining the first image, the second image, or both comprises obtaining an image with a camera.

4. The method of claim 3, wherein obtaining the first image, the second image, or both comprises operatively coupling the camera to two or more polarizers.

5. The method of claim 3, wherein the camera is a polarization camera comprising polarizers.

6. The method of claim 1, wherein a difference between the first polarization angle and the second polarization angle is at least 10°.

7. The method of claim 1, further comprising obtaining one or more additional images of the dendrite at one or more additional polarization angles.

8. The method of claim 7, wherein the one or more additional polarization angles comprise a third polarization angle.

9. The method of claim 8, where the first polarization angle is 0°, the second polarization angle is 90°, and the third polarization angle is 135°.

10. The method of claim 8, wherein the one or more additional polarization angles comprise a third polarization angle and a fourth polarization angle.

11. The method of claim 8, wherein the first polarization angle is 0°, the second polarization angle is 45°, the third polarization angle is 90°, and the fourth polarization angle is 135°.

12. The method of claim 1, further comprising obtaining an additional image of the dendrite with an unfiltered light component.

13. The method of claim 1, wherein the preselected value is based at least in part on one or more of a composition of the dendrite, a morphology of the dendrite, and a location of each pair of pixels with respect to the dendrite.

14. The method of claim 13, wherein the multi-fluid dendrite comprises metallic particles.

15. A method of assessing the authenticity of a dendrite on a substrate, the method comprising:

illuminating the dendrite and the substrate with radiation;

obtaining a multiplicity of images of the dendrite on the substrate at a multiplicity of polarization angles;

obtaining a degree of linear polarization image, an angle of linear polarization image, or both from the multiplicity of images;

comparing the degree of linear polarization image, the angle of linear polarization image, or both with an unfiltered image of the dendrite and the substrate;

assessing a difference between an intensity of a pixel corresponding to the substrate and a pixel corresponding to the dendrite in the degree of linear polarization image, the angle of linear polarization image, or both; and if the difference exceeds a preselected value, identifying the dendrite as authentic.

16. The method of claim 15, wherein the multiplicity of polarization angles comprise 0°, 90°, and 135°.

17. The method of claim 15, wherein multiplicity of polarization angles comprise 0°, 45°, 90°, and 135°.

18. The method of claim 15, further comprising obtaining an additional image of the dendrite on the substrate with an unfiltered light component.

19. The method of claim 15, wherein the multiplicity of images comprises a first image obtained at a first polarization angle and a second image obtained at a second polarization angle.

20. The method of claim 19, wherein a difference between the first polarization angle and the second polarization angle is at least 10°.

21. The method of claim 15, wherein the intensity of the pixels corresponding to the dendrite in the degree of linear polarization image, the angle of linear polarization image, or both is substantially uniform.

22. The method of claim 15, wherein the multi-fluid dendrite comprises metallic particles.

23. The method of claim 15, wherein the preselected value is determined using a machine learning technique based on a multiplicity of images of authentic and non-authentic dendrites taken over a multiplicity of polarization angles.

24. The method of claim 23, wherein the preselected value is based at least in part on one or more of a composition of the dendrite, a morphology of the dendrite, and a location of each pair of pixels with respect to the dendrite.

25. A method of assessing the authenticity of a dendrite on a substrate, the method comprising:

illuminating the dendrite and the substrate with radiation;

obtaining a multiplicity of images of the dendrite on the substrate at a multiplicity of polarization angles;

obtaining a degree of linear polarization image, an angle of linear polarization image, or both from the multiplicity of images;

assessing a difference between an intensity of a pixel corresponding to the substrate and a pixel corresponding to the dendrite in the degree of linear polarization image, the angle of linear polarization image, or both; and if the difference exceeds a preselected value, identifying the dendrite as authentic, wherein the preselected value is determined using a machine learning technique based on a multiplicity of images of authentic and non-authentic dendrites taken over a multiplicity of polarization angles.

* * * * *